Figure 1:
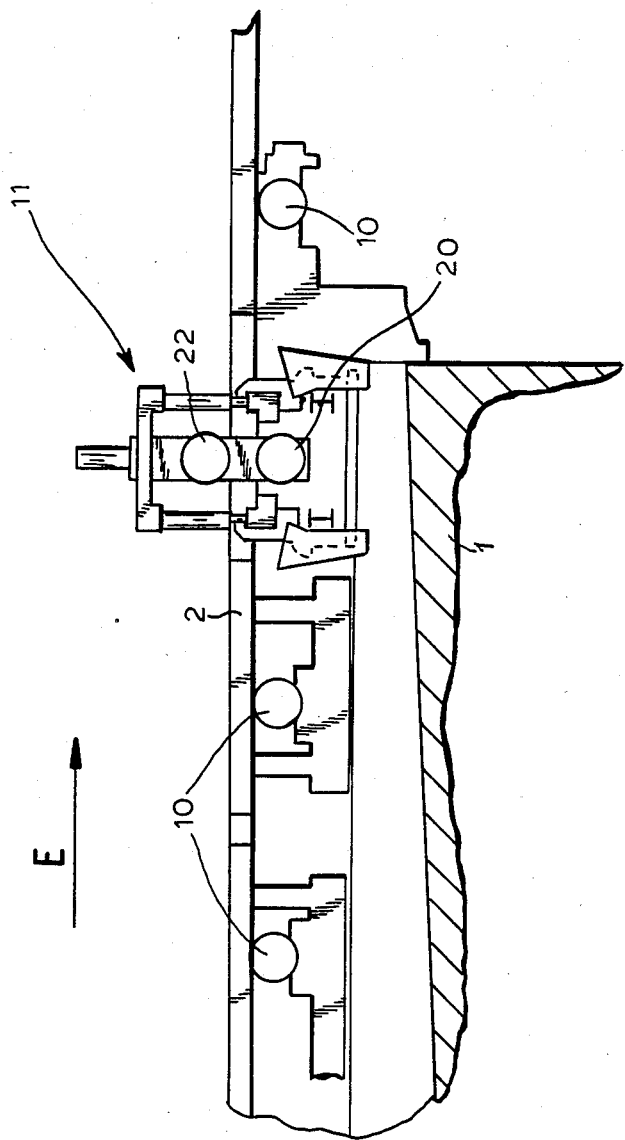

United States Patent [19]

Cazaux

[11] Patent Number: 4,498,821
[45] Date of Patent: Feb. 12, 1985

[54] DEBURRING APPARATUS

[75] Inventor: Joel Cazaux, Chelles, France

[73] Assignee: Fives-Cail Babcock, Paris, France

[21] Appl. No.: 478,058

[22] Filed: Mar. 23, 1983

[30] Foreign Application Priority Data

Apr. 6, 1982 [FR] France .............................. 82 05918

[51] Int. Cl.³ .............................................. B23D 1/22
[52] U.S. Cl. ..................................... 409/300; 409/308
[58] Field of Search ............... 409/297, 298, 300, 301, 409/308, 312, 321-324

[56] References Cited

U.S. PATENT DOCUMENTS

| 2,040,437 | 5/1936 | Huck | 409/308 |
| 2,225,399 | 12/1940 | Kraus | 409/312 |
| 3,198,081 | 8/1965 | Seeloff et al. | 409/300 |
| 4,362,448 | 12/1982 | Hasebe et al. | 409/300 |

FOREIGN PATENT DOCUMENTS

| 113389 | 10/1978 | Japan | 409/301 |
| 112593 | 10/1978 | Japan | 409/301 |

Primary Examiner—William R. Briggs
Attorney, Agent, or Firm—Kurt Kelman

[57] ABSTRACT

An apparatus for deburring a product of continuous casting, which comprises a support frame including two vertical side plates defining respective guides in alignment with each other in a direction transverse to the longitudinal extension of the product and the guides having open ends, the guides extending downwardly from the open ends in a direction substantially perpendicular to the surface of the product, and crossbeams extending in the transverse direction and interconnecting the side plates. A girder having two ends is glidably mounted in two transversely aligned ones of the guides and a burr cutter is mounted on the girder. Two superposed rollers defining a nip therebetween for passage of the product are rotatable for displacing the product in the longitudinal direction and have journals glidably mounted in two additional ones of the transversely aligned guides. Headers are arranged in the vertical plane of the side plates above the open ends of the guides, jacks link the ends of the girders to the headers for moving the girder towards the surface of the product to apply the cutter to said surface, and additional jacks link the upper roller to the headers for moving the upper roller towards the lower roller to clamp the product between the rollers.

4 Claims, 3 Drawing Figures

DEBURRING APPARATUS

The present invention relates to an apparatus for removing burrs from the ends of sections of a product of continuous casting. Such burrs are formed on a surface of the product sections when the continuous product is cut by a blowtorch into sections.

In continuous casting installations, the continuously cast product coming from a mold passes downwardly through a curved cooling rack where the product is solidified and the rack ends at a horizontal roller conveyor portion for removing the solidified product downstream of the blowtorch cutting station. The cutting causes burrs to be formed on the lower surface of the product sections and, when a burr cutter is applied to this surface to remove the burrs, the force of application tends to lift the product section, thus reducing the frictional contact between the conveyor rollers and the product section. If this contact is too weak, the force of entrainment exerted upon the product section by the conveyor rollers may be insufficient to overcome the resistance to the removal of the burrs and the installation malfunctions.

Instead of applying the cutter against the surface with the burrs while the product is displaced longitudinally in relation thereto, it has also been proposed to position the cutter fixedly so that its cutting edge lies in the support plane of the conveyor rollers. This requires a frequent repositioning of the fixed cutter to compensate for wear and does not assure complete deburring when the cast product has vertical deformations.

It is the primary object of this invention to overcome the disadvantages of these known arrangements and to provide a deburring apparatus wherein the displacement means for the product and the deburring cutter constitute an assembly which may be easily and rapidly mounted in a conventional continuous casting installation in place of one of the conveyor roller units of the roller conveyor.

The above and other objects are accomplished according to the invention with a deburring apparatus comprising a support frame including two vertical side plates defining respective guides in alignment with each other in a direction transverse to the longitudinal extension of the product and the guides having open ends, the guides extending downwardly from the open ends in a direction substantially perpendicular to the surface of the product, and crossbeams extending in the transverse direction and interconnecting the side plates. A girder having two ends is glidably mounted in two transversely aligned ones of the guides and a burr cutter is mounted on the girder. Two superposed rollers defining a nip therebetween for passage of the product are rotatable for displacing the product in the longitudinal direction and have journals glidably mounted in two additional ones of the transversely aligned guides. Headers are arranged in the vertical plane of the side plates above the open ends of the guides, jacks link the ends of the girders to the headers for moving the girder towards the surface of the product to apply the cutter to said surface, and additional jacks link the upper roller to the headers for moving the upper roller towards the lower roller to clamp the product between the rollers.

Figure 2:
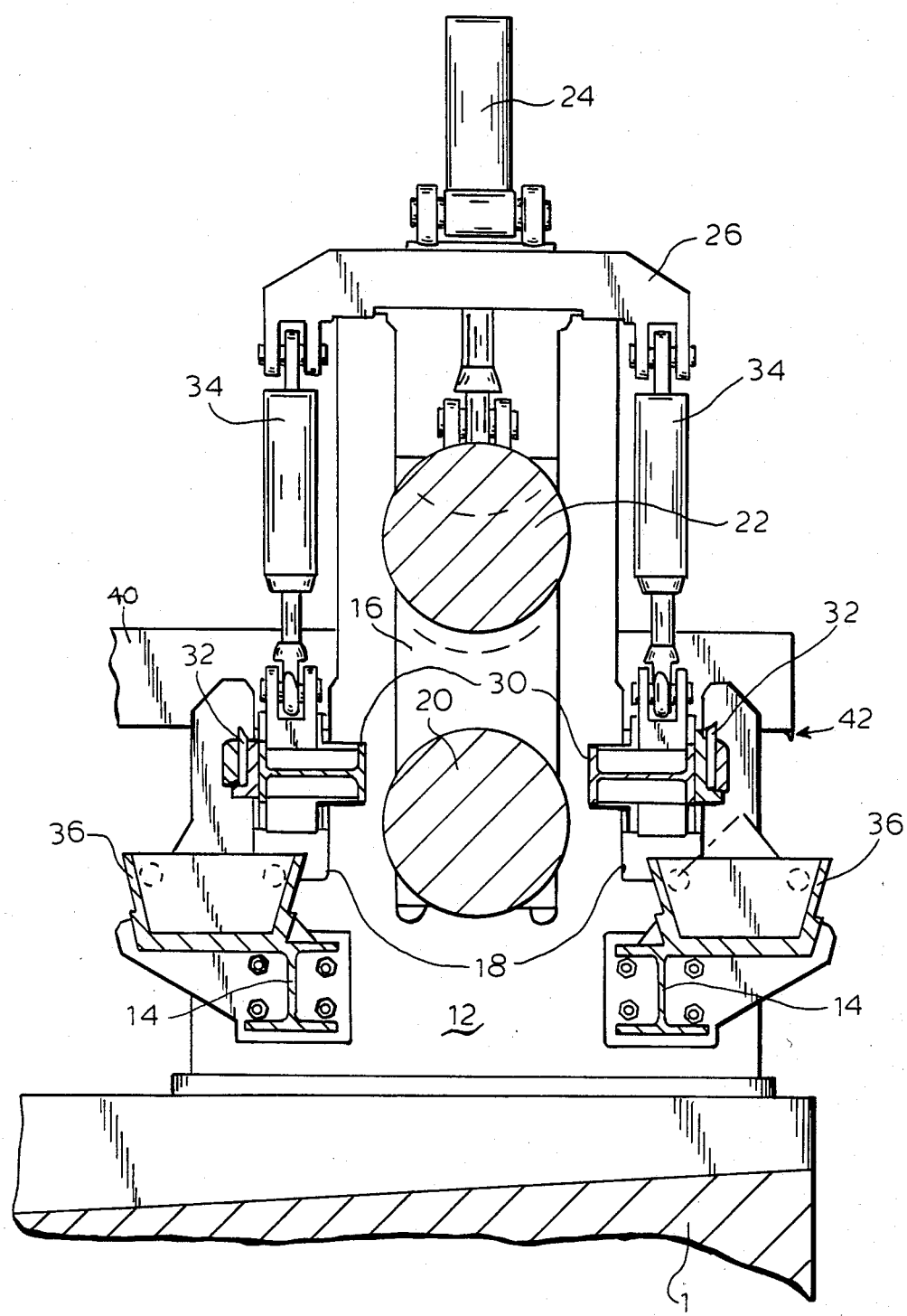
Figure 3:
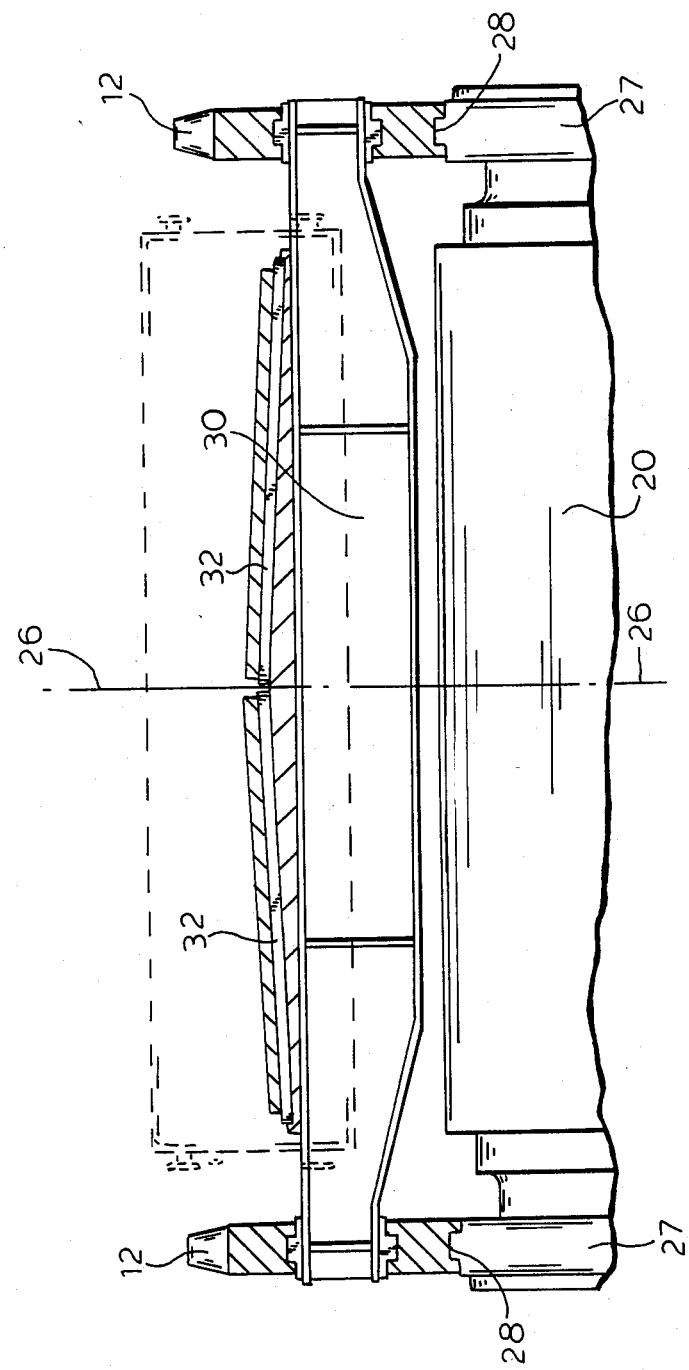

The above and other features of the invention will become more apparent from the following detailed description of a now preferred embodiment thereof, taken in conjunction with the partially schematic drawing wherein FIG. 1 is a fragmentary side elevational view of a portion of a roller conveyor disposed at the end of a continuous casting installation (not shown) for removing successive sections of the cast product and which incorporates the deburring apparatus of the present invention;

FIG. 2 is an enlarged side elevational view of the deburring apparatus partially in transverse section; and FIG. 3 is an end view of the apparatus in the plane of one of the cutters, partly in section.

Referring now to the drawing and first to FIG. 1, there is shown a portion of a horizontal roller conveyor comprised of conveyor sections 2 mounting conveyor rollers 10. The roller conveyor is mounted in support 1 downstream of a cutting zone of a continuous casting installation wherein the continuous cast product is cut into sections by a blowtorch. According to this invention, one of the conveyor sections 2 has been replaced by deburring apparatus 11, and this apparatus is designed to remove burrs formed at the ends of the product sections at the undersides thereof when the continuous casting is cut into sections by a blowtorch.

As shown in FIGS. 2 and 3, deburring apparatus 11 comprises a support frame including two vertical side plates 12 extending in the longitudinal direction of product 40 which has a surface with burrs 42 thereon. Crossbeams 14 extend in a direction transverse to the longitudinal direction and interconnect the side plates. The side plates define three guides in alignment with each other in the transverse direction. The guides have open ends and extend downwardly from the open ends in a direction substantially perpendicular to the surface of the product to be deburred.

Two girders 30, 30 are mounted on the support frame. Each girder has two ends glidably mounted in two transversely aligned guides 18, 18 and a burr cutter 32 is mounted on each girder. Two superposed rollers 20, 22 have journals glidably mounted in two additional ones of transversely aligned guides 16, guides 18 being narrower and shorter than guides 16 arranged centrally between the pairs of guides 18. In this manner, girders 30 are arranged respectively upstream and downstream with respect to superposed rollers 20, 22 in the direction of displacement of product 40. The rollers define a nip therebetween for passage of the product and they are rotatable for displacing the product in the longitudinal direction.

As indicated in FIG. 2, the journals of lower roller 20 rest on the bottom of guides 16, with the possible interposition of wedges. Headers 26 are affixed to the support frame, these headers being arranged in the vertical plane of side plates 12 above the open ends of guides 16, 18. Hydraulic jacks 34 link the ends of girders 30 to headers 26 for moving the girders towards the surface of product 40 to apply cutters 32 to the underside surface of the product, the girders being suspended on the jacks for glidable movement in guides 18. Additional jacks 24 link upper roller 22 to headers 26 for moving the upper roller towards lower roller 20 to clamp product 40 between the rollers. The journals of the upper roller are suspended on the piston rods of jacks 24 for glidable movement in guides 16.

As shown in FIG. 3, longitudinally extending grooves 28 are machined into the vertical side faces of guides 16 and journals 27 of roller 20 have matching tenons engaging the grooves with slight friction to absorb the axial forces of rollers 20, 22. Lower roller 20 of deburring apparatus 11 is located at the same level as rollers 10 of the roller conveyor so that product 40 moves smoothly along the conveyor incorporating apparatus 11. The ends of girders 30 have bearings gliding along the vertical side faces of guides 18 and similarly provided with tenons in engagement with grooves machined into these vertical side faces (see FIG. 3) to prevent any displacement of the girders in the longitudinal direction.

As shown in FIG. 3, each cutter 32 has the shape of a very flat V with a point located substantially in plane of symmetry 26 of apparatus 11, which coincides with the median longitudinal plane of the roller conveyor. The point of the upstream cutter, considered with respect to rollers 20, 22 in the conveying direction indicated by arrow E in FIG. 1, is directed upstream and the point of the downstream cutter is directed downstream. This shape of cutters 32 permits the forces to which they are subjected during deburring to be reduced while assuring a progressive and symmetrical application to the burrs.

As shown in FIG. 2, buckets 36 are mounted on the support frame below cutters 32 to receive the shavings detached from product 40 during deburring.

The operation of the above-described deburring apparatus is derived from the description of its structure and will be further elucidated hereinafter.

When product section 40 reaches deburring apparatus 11 on the roller conveyor, upper roller 22 is lifted by means of jacks 24 so that the nip between rollers 20 and 22 exceeds the thickness of the product section. Lower roller 20 is entrained to rotate at the same speed and in the same direction as conveyor rollers 10 while girders 30 are suspended by jacks 34 at a level at which cutters 32 are at a lower end position. In this position, the cutting edges of the cutters extend below the support plane for the product section defined by rollers 10 and 20. As soon as rotating rollers 10, 20 have moved product section 40 to the position shown in FIG. 2 wherein the product section extends between rollers 20 and 22, jacks 24 are operated to lower roller 22 against the upper surface of the product section whereby this product section is clamped between rollers 20 and 22. When the leading end of product section 40, as seen in conveying direction E, is above downstream cutter 32, the drive motors for conveyor rollers 10 and 20 are stopped. Jacks 34 are now operated to apply downstream cutter 32 to the underside of product section 40 and the conveyor rollers are rotated in the opposite direction so that the product section is moved backwards. During this return movement of the product section, burr 42 formed at the leading end of the product section is removed by downstream cutter 32. The drive motors of the conveyor rollers are now stopped again, the downstream cutter is lowered and the conveyor rollers are once rotated to advance production section 40 in conveying direction E. When the trailing end of the product section approaches the upstream cutter, the above-described operation is repeated to remove the burr from that end of the product section. The upstream cutter is then lowered, roller 22 is lifted and deburred product section 40 is removed by the roller conveyor.

While the invention has been described in connection with a now preferred embodiment, it will be understood that many variations and modifications may occur to those skilled in the art without departing from the spirit and scope of this invention as defined in the appended claims.

What is claimed is:

1. An apparatus for deburring a product of continuous casting, the product having a surface with burrs thereon and extending in a longitudinal direction, which comprises
   (a) a support frame including
      (1) two vertical side plates extending in said direction, the side plates defining respective guides in alignment with each other in a direction transverse to the longitudinal direction and the guides having open ends, the guides extending downwardly from the open ends in a direction substantially perpendicular to the surface of the product, and
      (2) crossbeams extending in the transverse direction and interconnecting the side plates,
   (b) a girder having two ends glidably mounted in two transversely aligned ones of the guides,
   (c) a burr cutter mounted on the girder,
   (d) two superposed rollers defining a nip therebetween for passage of the product, the rollers being rotatable for displacing the product in the longitudinal direction and having journals glidably mounted in two additional ones of the transversely aligned guides,
   (e) headers affixed to the support frame and respectively arranged in the vertical plane of a respective one of the side plates above the open ends of the guides,
   (f) jacks linking the ends of the girder to the headers for moving the girder towards the surface of the product to apply the cutter to said surface, and
   (g) additional jacks linking the upper roller to the headers for moving the upper roller towards the lower roller to clamp the product between the rollers.

2. The deburring apparatus of claim 1, comprising a further girder having two ends glidably mounted in two further transversely aligned ones of the guides, and a further burr cutter mounted on the further girder, the girders being arranged respectively upstream and downstream with respect to the superposed rollers in the direction of displacement of the product.

3. The deburring apparatus of claim 2, wherein the cutter has the shape of a very flat V with a point located substantially in a plane of symmetry of the apparatus, the point of the upstream cutter being directed upstream and the point of the downstream cutter being directed downstream.

4. The deburring apparatus of claim 2, further comprising buckets mounted on the support frame below the cutters.

* * * * *